United States Patent [19]

Upmeier

[11] Patent Number: 4,605,365
[45] Date of Patent: Aug. 12, 1986

[54] BLOWING HEAD FOR MAKING TUBULAR PLASTIC FILMS

[75] Inventor: Hartmüt Upmeier, Lengerich, Fed. Rep. of Germany

[73] Assignee: Windmoller & Holscher, Lengerich, Fed. Rep. of Germany

[21] Appl. No.: 751,145

[22] Filed: Jul. 2, 1985

[30] Foreign Application Priority Data

Jul. 10, 1984 [DE] Fed. Rep. of Germany ....... 3425371

[51] Int. Cl.$^4$ ..................... B29C 47/12; B29C 47/88
[52] U.S. Cl. .................................. 425/72 R; 425/461
[58] Field of Search .................. 425/72 R, 133.1, 461, 425/462

[56] References Cited

U.S. PATENT DOCUMENTS

| | | | |
|---|---|---|---|
| 2,626,427 | 1/1953 | Brown | 425/113 |
| 3,307,219 | 3/1967 | Bigland | 425/72 R |
| 3,520,966 | 7/1970 | Soffianti | 425/113 |
| 3,649,143 | 3/1972 | Papesh et al. | 425/72 R |
| 3,694,292 | 9/1972 | Schippers et al. | 425/133.1 |
| 4,111,630 | 9/1978 | Shiomi et al. | 425/133.1 |
| 4,525,131 | 6/1985 | Hauser | 425/113 |

Primary Examiner—Willard E. Hoag
Attorney, Agent, or Firm—Fleit, Jacobson, Cohn & Price

[57] ABSTRACT

In a blowing head for making tubular films from thermoplastic material, a lateral inlet for supplying molten material opens into a first annular passage having an upper boundary wall, which extends in a plane which is substantially radial with respect to the blowing head. A second annular passage is provided, which is concentric to the first annular passage and leads to a die orifice, from which the tubular film is extruded. The said second annular passage is separated from the first annular passage by a tubular partition, which has a flow guiding surface, which adjoins both annular passages. The axial length of said tubular insert, measured from the upper boundary wall to the flow guiding surface, decreases from the inner end of the inlet to the diametrically opposite line of confluence of the streams of molten material diverging from the inlet in such a manner that all flow paths for the molten material flowing from the inlet to the die orifice are substantially equal in length. In one aspect of the invention, the film blowing head is formed with concentric axial passages for supplying and withdrawing inflating and cooling air and one or each of the inner and outer walls defining the second annular passage is formed between the line of confluence of the streams of molten material and the die orifice with coolant conducting bores, which are connected to coolant supply and withdrawing lines. In a second aspect of the invention, a heating cuff extends in heat transfer relation to one or each of the inner and outer walls which define the second annular passage, with the exception of the region that extends axially from the line of confluence to the die orifice. Both aspects of the invention may be combined.

3 Claims, 2 Drawing Figures

BLOWING HEAD FOR MAKING TUBULAR PLASTIC FILMS

BACKGROUND OF THE INVENTION

1. Field of the Invention

This invention relates to a blowing head for making tubular films from thermoplastic materials, wherein a lateral inlet for supplying molten material opens into a first annular passage having an upper boundary wall, which extends in a plane which is substantially radial with respect to the blowing head, and wherein a second annular passage is provided, which is concentric to the first annular passage and leads to a die orifice, from which the tubular film is extruded, said second annular passage is separated from the first annular passage by a tubular partition, which has a flow guiding surface, which adjoins both annular passages, and the axial length of said tubular insert, measured from the upper boundary wall to the flow guiding surface, decreases from the inner end of the inlet to the diametrically opposite line of confluence of the streams of molten material diverging from the inlet in such a manner that all flow paths from the molten material flowing from the inlet to the die orifice are substantially equal in length.

2. Description of the Prior Art

The output of plants from making blown tubular plastic films is substantially restricted by the cooling capacity because at least the speed at which the tubular film is taken off must be so low that at the time at which the tubular films are collapsed to a flat shape they are sufficiently cooled to ensure that the superimposed layers of film will not stick together. It has been found that air is an ideal fluid for cooling the extruded tubular films because an abrupt cooling, which would adversely affect the quality of the film, will be avoided by the use of air. To ensure that the inflated tubular film will be cooled between the film blowing head and the collapsing device, the film blowing heads used in recent years inflate the tubular film by means of cooling air for internally cooling the inflated tubular film. The output rate which can be achieved with such blowing heads is vitually twice the output rate which can be achieved with tubular film blowing plants in which the inflated tubular film is air-cooled only on the outside. But the need for a replacement of the cooling and inflating air gives rise to the problem that the passages for supplying the air for internal cooling must extend through the film blowing head and must be so arranged that they will not adversely affect the conditions in the passages for supplying the molten material. Because the air for inflating and internally cooling the tubular film must be supplied at a high rate, said air for internal cooling can be supplied and withdrawn only in an axial direction. For this reason the molten material must be supplied to the film blowing head in a lateral direction unless a more expensive design is chosen, such as is apparent from German Patent Specification 23, 06 834.

Published German Application 20 09 914 discloses a film blowing head having a lateral inlet for molten material. A disadvantage of that known blowing head resides in that it is heated to different temperatures because the paths along which the molten material flows to the die orifice differ in length so that the temperature varies around the periphery of the film blowing head and it may be necessary to restore the die orifice to a centered position whenever the output rate or the plastic material is changed in such a manner that the temperature of the molten material will be altered.

In the film blowing head of the kind described first hereinbefore and known from German Patent Publication 17 29 055, the disadvantage residing in the presence of flow paths of different lengths for the molten material from the inlet to the die orifice from which the tubular film is extruded is avoided in that the molten material is deflected near the inlet to flow a way from the die orifice, the deflected molten material is subsequently deflected around a flow guiding surface having an approximately semielliptical shape to flow toward the die orifice, and the molten material is then guided to the die orifice. But it has been found that the tubular films made with that known film blowing head have a thin portion corresponding to the line of confluence of the streams of molten material that have diverged near the inlet.

SUMMARY OF THE INVENTION

It is an object of the invention to provide a film blowing head which is of the kind described first hereinbefore and which in conjunction with effective means for an internal cooling of the tubular film permits a making of tubular films having a more uniform wall thickness.

In accordance with the invention that object is accomplished in that the film blowing head is formed with concentric axial passages for supplying and withdrawing inflating and cooling air and one or each of the inner and outer walls defining the second annular passage is formed between the line of confluence of the streams of molten material and the die orifice with coolant conducting bores, which are connected to coolant supply and withdrawing lines.

The invention is based on the recognition that the construction formed in the tubular films made by a film blowing head of the kind described first hereinbefore is due to the fact that a seam is formed at the line of confluence of the streams of molten material and that the formation of that seam is due to the fact that the shearing of said streams at the wall results in a temperature rise of the molten material close to the boundary surfaces so that the molten material has at the line of confluence a portion which is at a higher temperature so that it has a lower viscosity and will be transversely stretched to a larger extent as the tubular film is inflated. A shearing of the molten material at a wall and the resulting change in viscosity takes place also at the boundary surfaces of the coaxial annular passages but in that case is uniformly distributed throughout the periphery of the molten material, which is subsequently extruded to form a tubular film, so that the resulting viscosity change dues not result in a change of the thickness of the tubular film. A different effect is produced in those boundary layers of the molten material which flow on the upper boundary surfaces of the first annular passage and merge at the line of confluence to form the seam. By the shearing at the wall, the molten material which forms that seam has been heated throughout the thickness of the stream of molten material and its viscosity has thus also been decreased throughout that thickness so that the wall thickness of the tubular film is reduced at said seam. In accordance with the invention one or both of the walls which define the annular passage that leads to the die orifice is or are cooled in a region which is axially aligned with said line of confluence so that the temperature and the viscosity of the molten material adjacent to the line of confluence are changed to be more equal to the temperature and viscosity, respectively, of the molten material in the adjoining regions and, as a result, the extruded tubular film has much smaller temperature variations around its periphery and is not constricted as a result of the confluence.

The coolant conducted through the temperature control bores may consist of compressed air for of a temperature control oil and should be at a temperature which is lower than the temperature of the molten extruded tubular film. The coolant reduces the temperature of the molten material at the line of confluence so that the viscosity of the molten material is increased there and an excessive constriction of the corresponding portion of the tubular film will be avoided.

The coolant conducting bores formed in the inner and outer walls which define the second annular passage may be supplemented or replaced by a heating cuff, which extends in heat transfer relation to one or each of said inner and outer walls, which the exception of the region that extends axially from the said line of confluence to the die orifice. By such heating cuff, that portion of the molten material which does not flow or has not flown near the line of confluence is heated up so that the temperature and viscosity variations in the extruded tubular film will be substantially eliminated.

Further features which can be adopted within the scope of the invention are recited in the dependent claims.

DETAILED DESCRIPTION OF THE PREFERRED EMBODIMENTS

Figure 1:
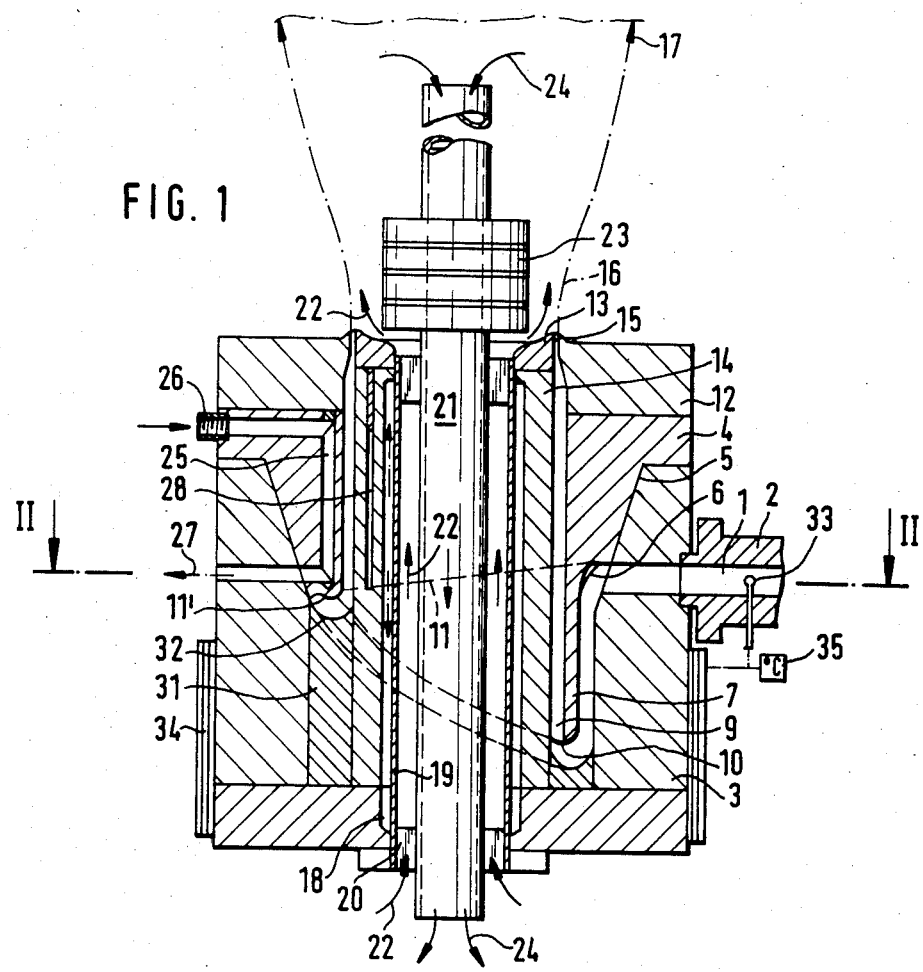
FIG. 1 is a longitudinal sectional view showing a film blowing head.
Figure 2:
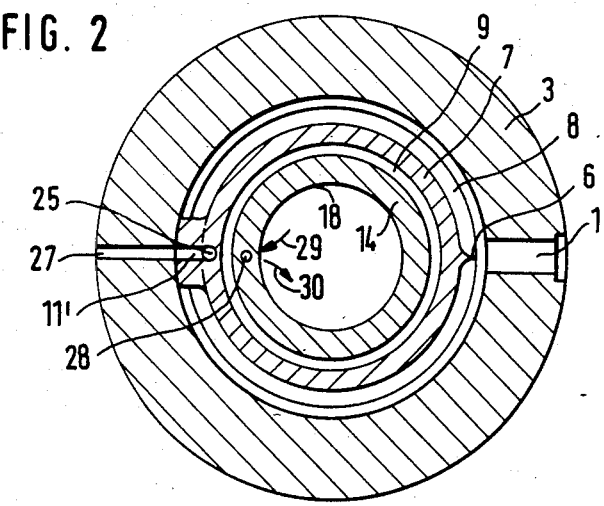
FIG. 2 is a transverse sectional view taken on line II—II in FIG. 1.

An extruder, not shown, which is used to process thermoplastic and/or elastomeric materials, supplies molten material through an inlet bore 1 of a flanged fitting 2 to a blowing head housing 3. The housing 3 contains a tubular insert 4, which defines flow passages and is seated on the housing 3 at a conical sealing surface 5. The insert 4 is formed with a dividing edge 6 for dividing the stream of molten material supplied from the inlet 1 through a supply bore in the housing 3 to a flow passage 8, which is defined by the inside surface of the housing 3 and the outside surface of an annular partition 7 of the insert 4. In said flow passage 8 the molten material flows away from the die orifice 15. At the free end of the partition 7, the latter has an approximately semielliptical flow guiding surface 10, around which the molten material is deflected to enter an inner annular passage 9, which leads to the annular die orifice 15. The arrangement is such that all flow paths leading from the inlet 1 to the die orifice 15 are substantially equal in length. The upper boundary surface 11 defining the flow passage 8 extends in an approximately radial plane and defines a base for the partition 7, 10 around which the molten material is deflected. At said surface 11 extending in an approximately radial plane the molten material is subjected to shearing resulting in an undesired temperature rise. At the flow merging edge 11', that temperature rise is effected throughout the thickness of the stream of molten material so that the blown tubular film will be constricted at that corresponding point.

An inner die ring 13 is carried by a sleeve 14, which constitutes the inside surface of the flow passage 9 for the molten material. An outer die ring 12 is mounted on the insert 4 and together with the inner die ring 13 defines the annular die orifice 15 from which the tubular film is extruded.

Cooling air is blown into the extruded tubular film 16 so that the latter is cooled and inflated and moved in a direction 17 to a take-off device, not shown, and is subsequently wound up.

The inner sleeve 14 defines an internal bore 18, which contains an air supply pipe 19, in which an air exhaust pipe 21 is held by radial webs 20. Internal cooling air 22 is delivered by a blower, not shown, and above the inner die ring 13 is supplied by the air supply pipe 19 to the inside surface of the tubular film. The flow of the air is controlled by a diagrammatically shown internal cooling device 23. Heated cooling air 24 is sucked from the tubular film by a blower, not shown, through the pipe 21.

The longitudinal axis of the blowing head, the axis of the inlet bore 1 for supplying molten material, and the edge 11' defining a line of confluence, at which the streams of molten material previously divided at the edge 6 merge, are disposed in a plane, in which a temperature control bore 25 is provided, which is formed in the insert 4 and which in the direction of flow of the molten material succeeds the stream-merging edge 11'. A supply line 26 and a withdrawing line 27 for a temperature control fluid are connected to the bore 25. A temperature control bore 28 which is parallel to the bore 25 is formed in the opposite wall of the inner sleeve 14 and disposed in the same height and has the same length as the bore 25. A supply line and a withdrawing line for a temperature control fluid are connected to the bore 28 and are indicated by arrows 29 and 30, respectively. The supply lines 26 and 29 and the withdrawing lines 27, 30 are respectively connected in parallel.

A guide ring 31 is axially aligned with the annular partition 7 and its flow guiding surface 10 and has at its top a concave surface 32, which has a uniform axial spacing from the flow guiding surface 10 of the annular partition 7.

The supply and withdrawing lines 29, 30 connected to the temperature control bore 28 formed in the inner sleeve 14 desirably extend between the inside surface of the sleeve 14 and the pipe 19 for supplying internal cooling air.

Due to a supply and dissipation of heat, there is a variation of temperature in the flow passages 8, 9, 10 around the periphery of the housing 3 of the blowing head on that side of the inlet 1 that is opposite to the die orifice 15. To reduce said temperature variation, a high-sensitivity sensor 33 is provided for measuring the temperature of the molten material in the inlet 1. A temperature controller, not shown, is provided, which in response to the output of the sensor 33 maintains a heating cuff 34 at the temperature of the molten material in the inlet 1 so that the housing is maintained at a uniform temperature around its circumference in the region in which the molten material flows around the circumference of the blowing head. It is desirable to provide on the inside surface of the inner sleeve 14 an inner heating cuff, which has at least the same axial length as the heating cuff 34 and serves to compensate the dissipation of heat from the inner sleeve to the internal cooling means 21 to 24. The temperature of the molten material measured by the thermocouple 33 may be indicated by a temperature display 35 so that the operating condition of the vlowing head can be judged.

The present embodiment constitutes a blowing head for making a single-ply tubular film. The same principle may be applied to a co-extruding blowing head for making a multi-ply tubular film. In that case the lateral passage for supplying molten material for the innermost ply will be most remote from the die orifice, the inlet for supplying molten material for the intermediate ply will be closer to the die orifice and the inlet for supplying molten material for the upper ply will be still closer to the die orifice.

I claim:

1. A blowing head for making tubular films from thermoplastic materials, wherein a lateral inlet for supplying molten material opens into a first annular passage having an upper boundary wall, which extends in a plane which is substantially radial with respect to the blowing head, and wherein a second annular passage is provided, which is concentric to the first annular passage and leads to a die orifice, from which the tubular film is extruded, said second annular passage is separated from the first annular passage by a tubular partition, which has a flow guiding surface which adjoins both annular passages, and the axial length of said tubular partition, measured from the upper boundary wall to the flow guiding surface, decreases from the inner end of the inlet to the diametrically opposite line of confluence of streams of molten material diverging from the inlet in such a manner that all flow paths for the molten material flowing from the inlet to the die orifice are substantially equal in length, characterized in that the film blowing head is formed with concentric axial passages for supplying and withdrawing inflating and cooling air and one or each of the inner and outer walls defining the second annular passage is formed between the line of confluence of the streams of molten material and the die orifice with coolant conducting bores, which are connected to coolant supply and withdrawing lines.

2. A film blowing head according to claim 1, characterized in that a heating cuff extends in heat transfer relation to one or each of the inner and outer walls which define the second annular passage, with the exception of the region that extends axially from the line of confluence to the die orifice.

3. A blowing head for making tubular films from thermosplastic materials, wherein a lateral inlet for supplying molten material opens into a first annular passage having an upper boundary wall, which extends in a plane which is substantially radial with respect to the blowing head, and wherein a second annular passage is provided, which is concentric to the first annular passage and leads to a die orifice, from which the tubular film is extruded, said second annular passage is separated from the first annular passage by a tubular partition, which has a flow guiding surface, which adjoins both annular passages, and the axial length of said tubular insert, measured from the upper boundary wall to the flow guiding surface, decreases from the inner end of the inlet to the diametrically opposite line of confluence of the streams of molten material diverging from the inlet in such a manner that all flow paths for the molten material flowing from the inlet to the die orifice are substantially equal in length, characterized in that a heating cuff extends in heat transfer relation to one or each of the inner and outer walls which define the second annular passage, with the exception of the region that extends axially from the line of confluence to the die orifice.

* * * * *